(12) United States Patent
Frisk

(10) Patent No.: US 7,404,869 B2
(45) Date of Patent: *Jul. 29, 2008

(54) METHOD FOR PRODUCING PACKAGING LAMINATED MATERIAL

(75) Inventor: Peter Frisk, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/552,506

(22) PCT Filed: Dec. 4, 2003

(86) PCT No.: PCT/JP03/15517

§ 371 (c)(1),
(2), (4) Date: Jun. 28, 2006

(87) PCT Pub. No.: WO2004/089615

PCT Pub. Date: Oct. 21, 2004

(65) Prior Publication Data

US 2007/0034330 A1    Feb. 15, 2007

(30) Foreign Application Priority Data

Apr. 7, 2003    (JP) .............................. 2003-102725

(51) Int. Cl.
- B44C 1/16    (2006.01)
- B44C 1/24    (2006.01)
- B65B 61/00   (2006.01)
- B65B 51/22   (2006.01)
- B65D 33/24   (2006.01)
- B65B 61/24   (2006.01)
- B65D 33/30   (2006.01)

(52) U.S. Cl. .................... 156/233; 156/230; 206/524.1; 206/524.3; 53/410; 53/416; 53/477; 53/DIG. 2; 383/94; 383/210; 383/42

(58) Field of Classification Search ................. 156/230, 156/233

See application file for complete search history.

(56) References Cited

U.S. PATENT DOCUMENTS 4,264,668 A * 4/1981 Balla ....................... 428/195.1

(Continued)

FOREIGN PATENT DOCUMENTS

JP          2-147326 A       6/1990

(Continued)

*Primary Examiner*—Philip C Tucker
*Assistant Examiner*—Sonya Mazumdar
(74) *Attorney, Agent, or Firm*—Buchanan Ingersoll & Rooney PC

(57) ABSTRACT

A method for producing a laminated material, which comprises providing a raw material roll containing a support layer, drawing out a support layer in a web form from the raw material roll, transferring a silver-based thin film layer on an inner face of the inside of the support layer including a zone to be heat-sealed by the high frequency induction heating for the formation of a container, prior to or after the transferring step, laminating a heat-sealable inner layer on the inside of the support layer, printing the design of the container on the outside of the support layer in a long web form, and forming one or more thermoplastic layers of the same type or different types, at the same time or sequentially, on the outside and the inside of the printed support layer in a web form. The method allows a sealing zone to be formed so as to have an antibacterial atmosphere.

4 Claims, 3 Drawing Sheets

U.S. PATENT DOCUMENTS

| | | | |
|---|---|---|---|
| 4,501,808 A * | 2/1985 | Sakai et al. | 430/58.4 |
| 5,478,643 A * | 12/1995 | Peiffer et al. | 428/332 |
| 2003/0186032 A1* | 10/2003 | Rosenberger et al. | 428/195.1 |

FOREIGN PATENT DOCUMENTS

| | | | |
|---|---|---|---|
| JP | 2-180105 A | | 7/1990 |
| JP | 4-19139 A | | 1/1992 |
| JP | 11-29110 A | | 2/1999 |
| WO | WO 02/21220 A1 | * | 3/2002 |

* cited by examiner

METHOD FOR PRODUCING PACKAGING LAMINATED MATERIAL

TECHNICAL FIELD

The present invention relates to a method for producing a packaging laminated material.

BACKGROUND ART

A laminated material in a web-form used for packaging containers comprising a support layer and a thermoplastic inner layer in which a carbon black conductive layer is laminated between the support layer and the thermoplastic innermost layer at zones to be heat-sealed by high-frequency induction heating for the formation of a container is known (for example, as described in JP-B No. 63-222). In the laminated material, a support layer, a thermoplastic innermost layer and a carbon black conductive layer as an intermediate layer therebetween are constituted.

A packaging machine in which an attaching device for attaching an aluminum foil tape for high-frequency induction heating to a portion of a laminated material in a web-form to be heat-sealed is disposed to conduct high-frequency induction heating the aluminum foil tape by high-frequency coils of a heater is described, for example, in JP No. 2694286.

When the laminated materials in the web-form used for packaging containers are piled, and the heat-sealable innermost layer is melted to form a zone to be sealed, liquid foodstuffs to be filled and packaged or the like might be left on the sealing zone and vicinity thereof, and the residue is likely to be polluted by bacteria or the like from the outside. The sealing zone and vicinity thereof should be formed so as to have an antibacterial atmosphere or formed with an antibacterial material.

Packaging paper containers for liquid foodstuffs are classified into aseptic packaging storable at a normal temperature and chilled packaging put under chilled distribution such as milk containers. Respective packaging laminated materials are generally produced as aseptic packaging and chilled packaging separately, and filled and packaged with liquid foodstuffs by separate sealing methods by means of separate filling and packaging machines.

However, even for different packaging systems of aseptic packaging and chilled packaging, efficient running/employment/operation of the whole packaging system are allowed through diversion or transfer of parts of different packaging systems and, further, this contributes to the saving of energy and materials and the reduction of production cost.

DISCLOSURE OF THE INVENTION

The present invention has an object of providing a packaging laminated material capable of solving the subject described above.

The method for producing the packaging laminated material capable of solving this subject, comprises providing a raw material roll containing at least a support layer, drawing out a support layer in a web-form from the raw material roll, transferring a silver-based thin film layer vapor deposited on a substrate on an inner face of the inside of the support layer including a zone to be heat-sealed by the high frequency induction heating for the formation of a container, prior to or after the transferring step, laminating a heat-sealable inner layer on the inside of the support layer, printing the design of the container on the outside of the support layer in the long web-form indirectly or directly, and forming one or more thermoplastic layers of the same type or different types, at the same time or sequentially, on the outside and the inside of the printed support layer in the web-form.

The method allows a sealing zone and vicinity thereof to be formed so as to have an antibacterial atmosphere or formed with an antibacterial material. Even for different packaging systems of aseptic packaging and chilled packaging, parts of different packaging systems can be diverted or transferred. Thereby efficient running/employment/operation of the whole packaging system are allowed and, further, this contributes to the saving of energy and materials and the reduction of production cost.

The invention for the method of producing the packaging laminated material according to claim 1 is a method of producing the laminated material in the web-form used for packaging containers comprising at least the support layer and the heat-sealable inner layer, which includes, a step of providing the raw material roll for the support layer, a step of drawing out a support layer in a web form from the raw material roll, a step of transferring the silver-based thin film layer vapor-deposited on the substrate on the inner face of the inside of the support layer including the zone to be heat-sealed by the high frequency induction heating for the formation of the container, prior to or after the transferring step, a step of laminating a heat-sealable inner layer on the inside of the support layer, a step of printing the design of the container on the outside of the support layer in a long web form indirectly or directly, and a step of forming one or more thermoplastic layers of the same type or different types, at the same time or sequentially, on the outside and the inside of the printed support layer in the web-form.

In the invention for the method of producing the packaging laminated material according to claim 2, the silver-based thin film layer vapor-deposited on the substrate is transferred, on the inner face of the laminated heat-sealable inner layer, immediately before heat-sealing by the high frequency induction heating for the formation of the container.

In the invention for the method of producing the packaging laminated material according to claim 3, the silver-based thin film layer vapor-deposited on the substrate is transferred, on the inner face of the thermoplastic intermediate layer laminated on the inside of the support layer.

In the invention for the method of producing the packaging laminated material according to claim 4, the silver-based thin film layer vapor-deposited on the substrate is transferred, on the inner face of the inside of the support layer directly.

The invention having the constitutions described above has the following functions.

The laminated material in the web-form used for packaging containers according to the invention is in an elongate strip-form (web-form) capable of forming a number of containers and, that enables filling-up and production of packaging containers continuously at a high speed.

In the present invention, the support layer provides the packaging container and the laminated material with a physically mechanical strength and maintains and supports the shape and form, etc. thereof. The thermoplastic inner layer is also the innermost layer or the innermost vicinity layer for the wall of the container and is in direct or closely indirect contact with a liquid foodstuff to prevent permeation/moistening of liquid relative to the support layer of the container. Further, the inner layer is melted and softened by heat to form sealing zones in the heat-sealing.

The silver-based thin film layer is the thin layer vapor-deposited on the substrate, which is transferred on the inner face of the inside of the support layer including the zone to be heat-sealed by the high frequency induction heating for the formation of the container.

Since the silver-based thin film layer has electric conductivity, when a high-frequency current is applied to external coils, an induced current is generated by high-frequency induction in the conductive layer and the heat caused by the resistance melts and seals the plastic material (thermoplastic material/resin) of the adjacent inner layer. That is, in the invention, the conductive layer is inductively heated by high-frequency induction heating upon formation of the container, the generated heat is conducted to the innermost layer, by which the thermoplastic innermost layer is heated and melted and softened. At the heated regions, heat seal zones are formed.

The invention for the method of producing the packaging laminated material is a method of producing the laminated material in the web-form used for packaging containers comprising at least the support layer and the heat-sealable inner layer, which includes, a step of providing the raw material roll for the support layer, a step of drawing out the support layer in the web-form from the raw material roll, a step of transferring the silver-based thin film layer vapor-deposited on the substrate on the inner face of the inside of the support layer including the zone to be heat-sealed by the high frequency induction heating for the formation of the container, prior to or after the transferring step, a step of laminating a heat-sealable inner layer on the inside of the support layer, a step of printing the design of the container on the outside of the support layer in the long web-form indirectly or directly, and a step of forming one or more thermoplastic layers of the same type or different types(e.g. gas barrier property, light barrier property, etc.), at the same time or sequentially, on the outside and the inside of the printed support layer in the web-form.

In a preferred embodiment of the invention, the silver-based thin film layer vapor-deposited on the substrate is transferred, on the inner face of the laminated heat-sealable inner layer, immediately before heat-sealing by the high frequency induction heating for the formation of the container.

The transferring step is conducted in a machine to form the container that is a packaging and filling machine by the embodiment. The laminated material in the embodiment comprises (outside) an outermost thermoplastic layer, a printed layer, a support layer like paper, a heat-sealable inner layer and a silver-based thin film layer (inside), for example. And the layer constitution other than the zone to be heat-sealed (sealing zone) by the high frequency induction heating for the formation of the container is (outside) an outermost thermoplastic layer, a printed layer, and a support layer like paper, a heat-sealable inner layer (inside), for example, in a region where the silver-based thin film layer is not transferred.

The advantage of this embodiment is that transcription is carried out at the approximately last step of the formation of the container, and packaging and filling can be therefore efficiently performed by a considerably extended choice of the packaged material. Since the silver-based thin film layer is the innermost layer, a heat-sealable material can be directly heated, enabling effective heating and sealing. Further, the silver component of the thin film (metallic silver, silver ion, silver oxide, etc.) discontinuously covers the whole sealing zones by pressure in heat sealing, and allows the sealing zones and vicinity thereof to be formed so as to have an antibacterial atmosphere or formed with an antibacterial material.

In the method of producing the laminated material in the web-form in the preferred embodiment of the invention, the silver-based thin film layer vapor-deposited on the substrate is transferred on the Inner face of the thermoplastic intermediate layer laminated on the inside of the support layer.

According to the embodiments, the transferring step can be conducted in the step of producing the laminated material i.e. in a laminated material manufacturing plant. The laminated material in the embodiment comprises (outside) an outermost thermoplastic layer, a printed layer, a support layer like paper, a thermoplastic intermediate layer, a silver-based thin film layer and a heat-sealable inner layer (inside), for example. And the layer constitution other than the zone to be heat-sealed (sealing zone) by the high frequency induction heating for the formation of the container is (outside) an outermost thermoplastic layer, a printed layer, and a support layer like paper, a thermoplastic intermediate layer and a heat-sealable inner later (inside), for example, in a region where the silver-based thin film layer is not transferred.

The advantage of this embodiment is that transcription is carried out at the process where it is rapidly laminated in the laminated material manufacturing plant, and the transferring step can be therefore performed efficiently, that is, at a high speed.

In the method of producing the laminated material in the web-form in the preferred embodiment of the invention, the silver-based thin film layer vapor-deposited on the substrate is directly transferred on the Inner face of the inside of the support layer.

As is the case with the above embodiment, according to the embodiments, the transferring step can be conducted in the laminated material manufacturing plant. The laminated material in the embodiment comprises (outside) an outermost thermoplastic layer, a printed layer, a support layer like paper, a silver-based thin film layer and a heat-sealable inner layer (inside), for example. And the layer constitution other than the zone to be heat-sealed (sealing zone) by the high frequency induction heating for the formation of the container is (outside) an outermost thermoplastic layer, a printed layer, and a support layer like paper and a heat-sealable inner later (inside), for example, in a region where the silver-based thin film layer is not transferred.

The advantage of this embodiment is that transcription is carried out at the process where it is rapidly laminated in the laminated material manufacturing plant, and transcription process can be therefore performed efficiently, that is, at a high speed. Further, the direct transfer enables omission of the extra intermediate layer, providing an inexpensive and thin packaging material.

In the heat sealing of the laminated material according to the invention provides the laminated material of the invention, that is, the laminated material comprising the support layer and the thermoplastic inner layer, in which the laminated material in the web-form with the silver-based thin film layer is laminated on the inside of the support layer at zones where heat-sealing is conducted by high-frequency induction heating for forming the container so that the heat generated by the induction heating is conducted to the inner layer. The laminated material in the web-form is usually taken-up as a rolled form and stored or conveyed.

For example, a rolled laminated material in a web form is loaded to a packaging and filling machine, and the laminated material is delivered from the roll and then conveyed into the filling machine. The laminated material in the web-form under conveyance is formed into a tubular shape as lowering. A longitudinal seal is applied to the longitudinal direction of the laminated material to provide a liquid tight state with no liquid leakage. In the case of applying the longitudinal sealing by the high-frequency induction heating, heat seal zones are formed by the high-frequency induction heating.

A liquid foodstuff is filled fully in the laminated material tube.

Heat seal zones are formed by the high-frequency induction heating every predetermined interval in the traversing direction of the filled tube and, preferably, under a liquid surface and transversal sealing is done. Then, the center of the sealing zones is cut, for example, by a cutter knife to form individual containers and, optionally, it is folded along the creases into a final shape.

BEST MODE FOR CARRYING OUT THE INVENTION

Embodiments of the present invention are to be described specifically below using FIG. 1 to FIG. 5.

EMBODIMENT 1

Figure 1:
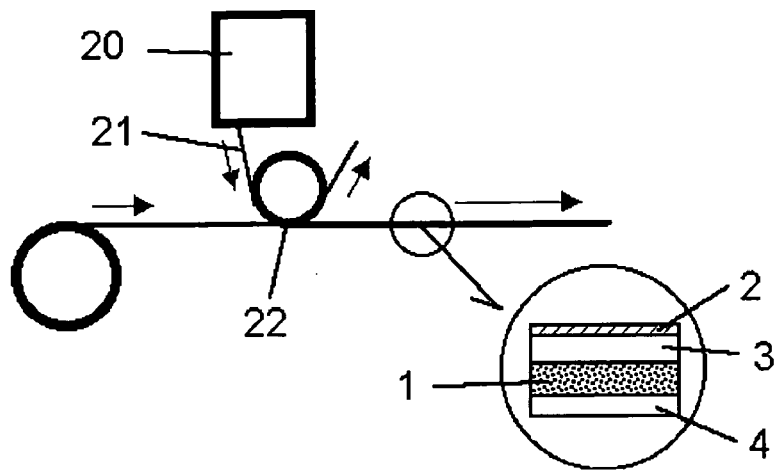
FIG. 1 is a cross sectional view for a method for producing a laminated material in a web-form as an embodiment according to the invention.

FIG. 1 is a schematic drawing of process for transferring step of the laminated material in the web-form as an embodiment according to the invention, and an enlarged cross sectional view for a portion of the laminated material. In FIG. 1, the laminated material comprises a support layer 1 made of paper, card board, plastic material or a composite material thereof, a thermoplastic inner layer 3 such as one made of low density polyethylene or linear chain low density polyethylene, a silver-based thin film layer 2 laminated on the inner face of the thermoplastic inner layer 3 at zones where heat-sealing is conducted by high-frequency induction heating so that the heat generated by the induction heating is conducted to the inner layer 3, and an outer layer of thermoplastic material 4 laminated outside.

The silver-based thin film layer 2 is a layer 2 which the silver-based thin film vapor-deposited on a substrate film 21 is transferred through transferring step by a hot stamp transcriber 22 in a silver-vapor depositing machine 20.

In the silver-vapor depositing machine 20, silver vapor is vaporized from solid silver, and the silver-based thin film of metallic silver/silver oxide of 10 micron or thinner preferably about 0.1 to 1 micron is vapor deposited on the flat surface of the substrate film 21 of 25 micron or thinner which continuously passes through a silver vapor atmosphere in the machine.

Figure 2:
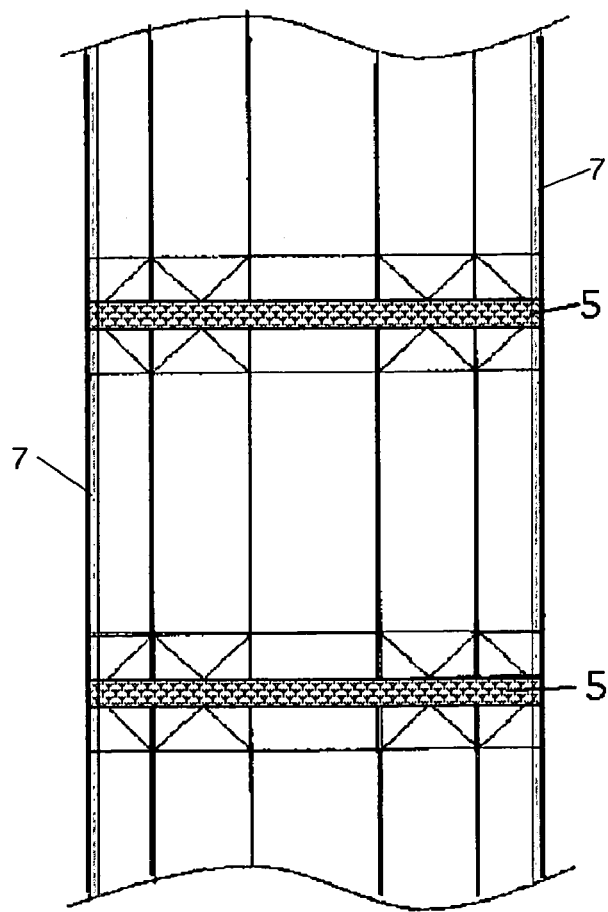
FIG. 2 is a plan view for a portion of a laminated material in a web-form as an embodiment according to the invention.

FIG. 2 is a plan view for a portion of a laminated material in a web-form as an embodiment of the invention. In FIG. 2, a web-shaped laminated material is a laminated material of a support layer comprising paper, plastic or a composite material thereof and a thermoplastic layer such as one formed of low density polyethylene. A plurality of packaging containers are obtained from the laminated material in which a portion between two sealing zones 5 for transversal sealing in the transversal direction corresponds to one packaging container. A silver-based thin film layer 2 is laminated on the inside of the support layer at the zones 5 where the heat-sealing is conducted by the high-frequency induction heating so that the heat generated by the induction heating is conducted to the inner layer.

In the case of longitudinal sealing by high-frequency induction heating, the silver-based thin film layer is laminated also at both end portions 7 of the laminated material in the web-form so as to form heat-sealing zones by the high-frequency induction heating.

The silver-based thin film layer is laminated to the zones 5 and the vicinity thereof as shown in FIG. 2, as well as to both end portions 7 and 7 in the case of applying a longitudinal sealing by the high-frequency induction heating.

Figure 3:
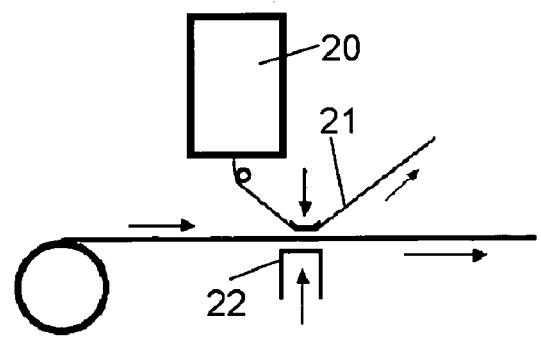
FIG. 3 is a cross sectional view for a method for producing a laminated material in a web-form as another embodiment of the invention.

FIG. 3 is a schematic drawing of process for transferring step of the laminated material in the web-form as another embodiment according to the invention. Shown in FIG. 3, in a silver- vapor depositing machine 20, silver vapor is vaporized from solid silver, and a silver-based thin film of metallic silver/silver oxide of 0.5 to 2 micron is vapor deposited on the flat surface of a substrate film 21 of about 20 micron which continuously passes through a silver vapor atmosphere in the machine. The silver-based thin film vapor-deposited on the substrate film 21 is transferred on the laminated material by a hot stamp transcriber 22, composing the silver-based thin film layer 2.

For the web, a design of the container is printed indirectly or directly to the outer surface of the support layer in the web-form, in the printing step. Here, the phrase of "indirectly or directly" means that a plastic laminate layer, a film layer, an adhesive layer, an anchor coat layer or the like may be also laminated between the printed layer for a pattern or design and the support layer surface.

The same type or different types of one or more thermoplastic layers are formed at the same time or sequentially, on the outside and the inside of the printed support layer in the web-form. As a result, single or multiple outer layers and an inner layer are formed. Further, a puncture for a straw and ruled lines (fold lines) for facilitating the formation of the container are formed optionally to the laminated material, in the midway step.

Figure 4:
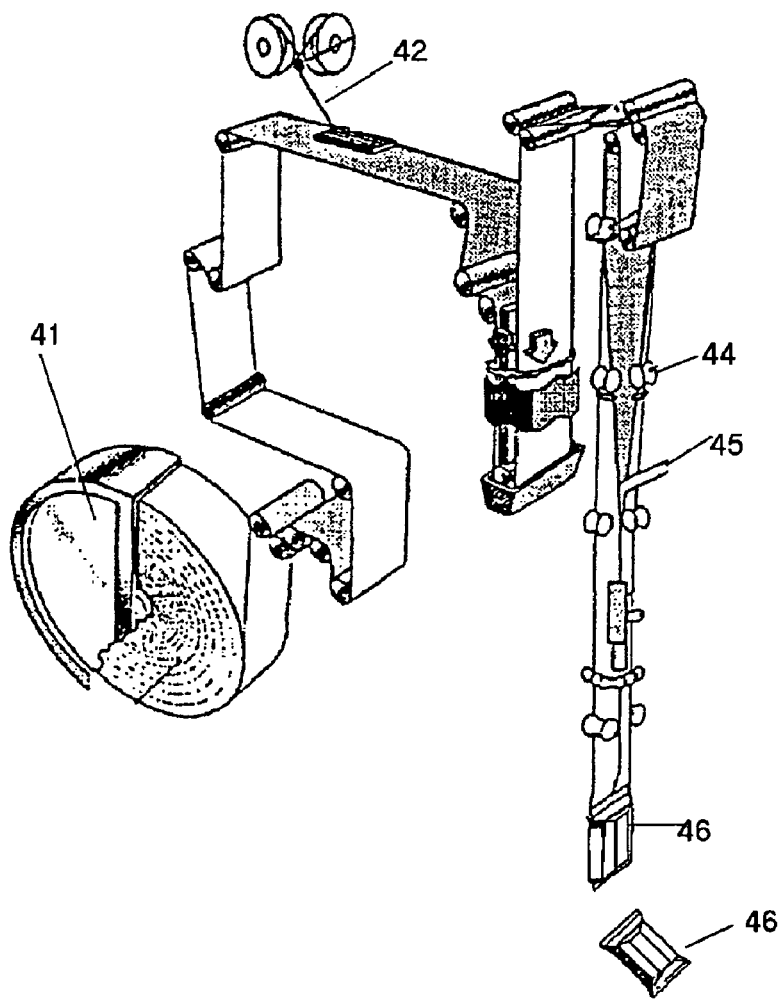
FIG. 4 is a schematic view for a packaging and filling machine used in the invention.

A method of heat sealing the laminated material in an embodiment of the invention is to be described with reference to FIG. 4 and FIG. 5. FIG. 4 is a schematic view for a packaging and filling machine used in the invention.

The laminated material of the invention, that is, a laminated material in a web-form comprising a support layer, a silver-based thin film layer and a thermoplastic inner layer is provided. A rolled laminated material in a web-form 41 is loaded on a packaging and filling machine, and the laminated material is delivered from the roll 41 and conveyed into the filling machine. A laminated material in a web-form under conveyance is attached with a strip tape for longitudinal sealing by an applicator 42 and then formed into a tubular shape while lowering by a roller 44. It is applied with longitudinal sealing in the longitudinal direction of the laminated material and formed into a liquid tight state with no liquid leakage. In the case of joining the strip tape for longitudinal sealing to one end of the laminated material by high-frequency induction heating, the conductive layer is laminated also at its one end 7. Further, in the case of applying the longitudinal sealing by the high-frequency induction heating, the conductive layer is laminated also to both the ends 7 and 7 of the laminated material web for forming heat-sealing zones by the high-frequency induction heating.

A liquid foodstuff is poured fully into the laminated material tube from a filling pipe 45.

Figure 5:
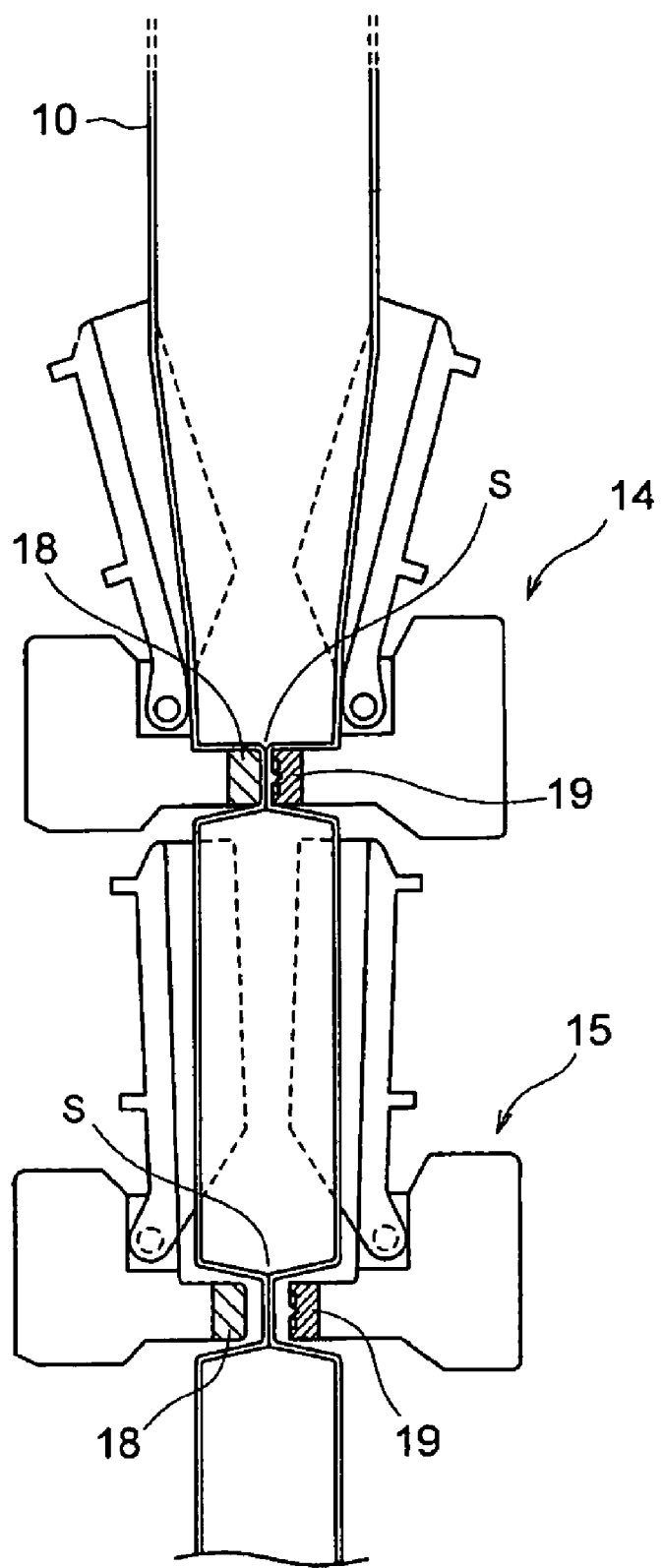
FIG. 5 is a schematic view for a transversal sealing device of a filling machine used in the invention.

A heat-sealing zone is formed by the high-frequency induction heating in the traversing direction of the thus filled tube, under a liquid surface on every predetermined interval and then transversal sealing is conducted by a transversal sealing device (shown in FIG. 5).

Then, the center for each sealing zone described is cut by a cutting knife, etc. to form individual containers 46 which are folded along the creases if necessary to form each into a final shape.

FIG. 5 is a schematic view of a transversal sealing device of the filling machine.

As shown in FIG. 5, two sets of transversal sealing devices 14 and 15 moving vertically press the filled laminated material tube 10 in the traversing direction by a high-frequency induction heating inductor 19 and a counter jaw 18, heat and cool the same and form heat sealing zones S on every predetermined interval by high-frequency induction heating to apply transversal sealing.

Then, the center of each sealing zone S described is cut by a cutting knife (not illustrated) to form individual containers.

EMBODIMENT 2

In the embodiment of claim 2, a transcriber is mounted at the upstream or downstream of the applicator 42, and the strip tape for longitudinal sealing in the packaging and filling machine shown in FIG. 4 is transferred.

In addition to the container shape in the embodiment described above, the packaging container in the invention includes, for example, a brick-shape (parallelepiped), as well as hexagonal prism, octagonal prism, tetrahedral shape, gable-top containers and the like.

As has been described above, the following advantageous effect can be obtained according to the invention.

The sealing zone and vicinity thereof should be formed so as to have an antibacterial atmosphere or formed with an antibacterial material.

Even for different packaging systems of aseptic packaging and chilled packaging, since a portion of different packaging systems can be diverted or transferred, this enables efficient running/employment/operation of a whole packaging system and, further, this can contribute to the saving of energy and material and reduction of production cost.

This invention enables to form sealing/joining by a novel sealing method and exact treatment is possible within a printing press during high speed printing by utilizing an automatic joining device and it can be conducted at a mass production level of a large-scaled flexographic printing press or photogravure printing press.

According to the method of the invention, the rapid and reliable sealing method can be applied to inexpensive packaging material not containing a metal foil layer at all.

INDUSTRIAL APPLICABILITY

The method for producing the packaging laminated material of the invention is utilized to packaging containers for containing liquid foodstuffs such as milk, beverages, and the like.

The invention claimed is:

1. A method for producing a laminated material in a web-form used for packaging containers comprised of at least a support layer and a heat-sealable inner layer, comprising:
    providing a raw material roll for a support layer;
    drawing out the support layer in the web-form from the raw material roll;
    transferring a silver-based thin film layer vapor-deposited on a substrate on an inner face of the inside of the support layer including a zone to be heat-sealed by high frequency induction heating for the formation of a container;
    prior to or after the transferring step of the silver-based thin film layer, laminating a heat-sealable inner layer on the inside of the support layer;
    printing a design of the container on the outside of the support layer in the web-form indirectly or directly; and
    forming one or more thermoplastic layers of the same type or different types, at the same time or sequentially, on the outside and the inside of the printed support layer in the web-form.

2. The method for producing the packaging laminated material according to claim 1, wherein the silver-based thin film layer vapor-deposited on the substrate is transferred, on the inner face of the laminated heat-sealable inner layer, immediately before heat-sealing by the high frequency induction heating for the formation of the container.

3. The method for producing the packaging laminated material according to claim 1, wherein the silver-based thin film layer vapor-deposited on the substrate is transferred, on the inner face of a thermoplastic intermediate layer laminated on the inside of the support layer.

4. The method for producing the packaging laminated material according to claim 1, wherein the silver-based thin film layer vapor-deposited on the substrate is transferred, on the inner face of the inside of the support layer directly.

* * * * *